No. 769,545. PATENTED SEPT. 6, 1904.
J. M. HOLCOMB.
VEGETABLE SLICER AND MEAT TENDERER.
APPLICATION FILED JUNE 20, 1904.
NO MODEL.
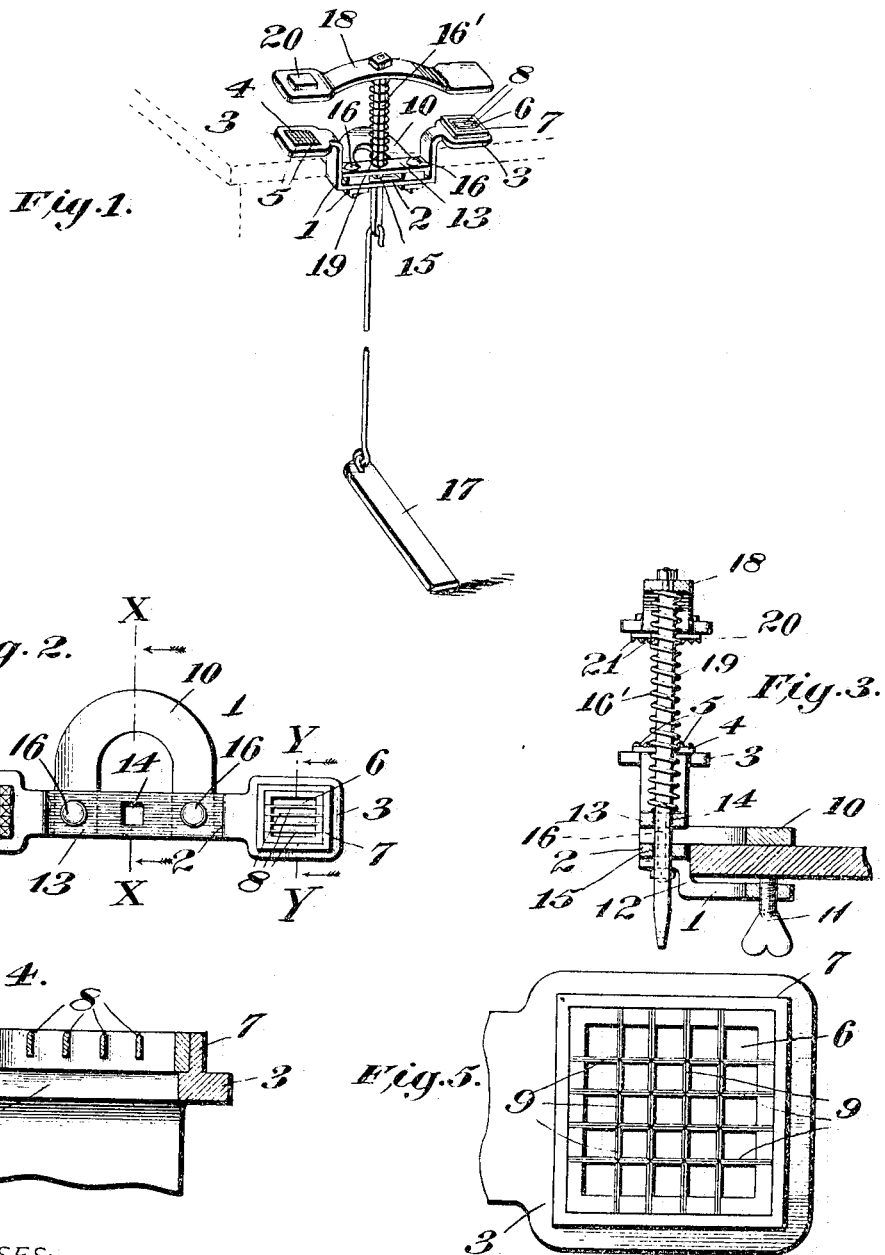
WITNESSES:
Elmer Leavey
W. C. Jael.
INVENTOR
James M. Holcomb
BY
R. W. Bishop
Attorney No. 769,545. Patented September 6, 1904.

UNITED STATES PATENT OFFICE.

JAMES M. HOLCOMB, OF OZONA, TEXAS.

VEGETABLE-SLICER AND MEAT-TENDERER.

SPECIFICATION forming part of Letters Patent No. 769,545, dated September 6, 1904.

Application filed June 20, 1904. Serial No. 213,280. (No model.)

*To all whom it may concern:*

Be it known that I, JAMES M. HOLCOMB, a citizen of the United States of America, residing at Ozona, in the county of Crockett and State of Texas, have invented certain new and useful Improvements in Vegetable-Slicers and Meat-Tenderers, of which the following is such a full, clear, and exact description as will enable others skilled in the art to which it appertains to make and use the same, reference being had to the accompanying drawings, forming a part hereof.

This invention relates to devices for cutting up potatoes or other vegetables for cooking and for making meat tender; and it consists in certain novel features hereinafter first fully described and then pointed out in the claims.

In the annexed drawings, which fully illustrate the invention, Figure 1 is a perspective view of the device in its operative position. Fig. 2 is a plan view of the lower portion of the device. Fig. 3 is a section taken on the line $x\,x$ of Fig. 2. Fig. 4 is a detail section taken on the line $y\,y$ of Fig. 2, and Fig. 5 is a plan view of a different form of knife.

In carrying out my invention I employ a lower or supporting member 1, comprising means for securing the device to a table or bench and a support for the article to be cut. The foundation for this member is a bar 2, bent up into substantially U shape and having the ends of its side arms bent outward, as shown at 3, to form plates on which the vegetable or meat rests. In one of said outturned ends is secured a block 4, having a multiplicity of points 5 on its upper side to constitute the lower half of the meat-tenderer. The other outturned end of the bar 2 is constructed with an opening 6 and a rib 7 on its upper side around the said opening, the said rib constituting a box adapted to receive the knife-frame and prevent horizontal movement thereof. The rib is set slightly away from the edge of the opening, so that the plate forms a shoulder or ledge on which the knife-frame rests. The knife-frame is an open ring, between the sides of which extend the parallel blades 8 in the preferred form of the device; but the intersecting knives 9 (shown in Fig. 5) may be used, if preferred. The knife-frame is removably fitted within the rib 7, so that the frames may be used interchangeably without requiring any dismemberment of the device. Projecting rearward from the upper and lower sides of the base of the bar 2 are the parallel horizontal plates 10, which are adapted to pass above and below a table or bench and support the device thereon, the lower of said plates carrying a set-screw 11, which is adapted to be turned up against the under side of the table or bench to secure the device thereto, as will be readily understood. The lower plate 10 is bent downward from the bar 2, so as to present the vertical shoulders 12, which abut against the edge of the table or bench, and thereby aid in positioning the device thereon. Across the ends of the upper plate 10 is arranged a bar 13, at the center of which is an opening 14 in vertical alinement with a central opening 15 in the bar 2. Bolts 16, inserted through the ends of the bar 13 and the plates 10 and the bar 2, secure the several parts together firmly. Slidably mounted in the openings 14 and 15 is a vertical rod or stem 16', having its lower end connected with a treadle 17 and having a horizontal presser bar or plate 18 secured to and carried by its upper end. A spring 19 is coiled around the rod between the presser-bar and the bar 13 and holds the presser-bar normally elevated. One end of this presser-bar is smooth and is adapted to press the potatoes against the knife-frame, so as to cut them, while the other end of the presser-bar carries a block 20, having a multiplicity of points or teeth 21 on its under side and constituting the upper member of the meat-tenderer.

The operation of the device will, it is thought, be readily understood. If meat is to be softened, it is placed on the lower member of the tenderer, and the operator then depresses the treadle, so as to bring the upper member of the meat-tenderer down against the tension of the spring. Upon releasing the pressure on the treadle the spring at once throws the presser-plate upward. When potatoes are to be cut, the proper knife-frame is fitted in place and a potato held thereon while the treadle is depressed to bring the presser-plate down onto the potato to force the same against the knives and down between them. The potato will thus be cut into slices or small strips, according to the form of knives used.

The device is very simple in its construction and is strong and durable. The bar 2 and the bar 13 present two guiding-points for the vertically-slidable rod, and thereby prevent swaying of the same, while the clamping-plates 10, the supporting-bar 2, and the guiding-bar 13 are all secured by the same bolts.

Having thus described my invention, what I claim, and desire to secure by Letters Patent, is—

1. The combination of the U-shaped bar having its ends turned outward to form article-supporting plates, clamping-plates projecting from the said bar and adapted to be clamped to a table or bench, the lower of said plates having a vertical shoulder adapted to impinge against the edge of the table, a guide-bar secured over the ends of the upper clamping-plate, and securing-bolts inserted through the guide-bar, the clamping-plates, and the U-shaped bar.

2. The combination of the U-shaped bar, the guide-bar above the base of the said U-shaped bar, the vertically-slidable rod mounted in said guide-bar and U-shaped bar, a presser-plate secured to the upper end of said rod, and a spring around the rod between the presser-plate and the said guide-bar.

In testimony whereof I have signed this specification in the presence of two subscribing witnesses.

JAMES M. HOLCOMB.

Witnesses:
   JOE NANCE,
   C. E. MASSENGALE.